Feb. 9, 1960     E. BIRKETT     2,924,355
HOPPERING MECHANISMS FOR PEN CONNECTORS
Filed Nov. 7, 1957                                         2 Sheets-Sheet 1
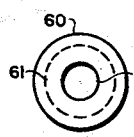 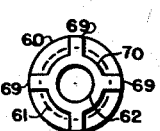 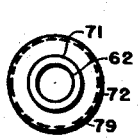 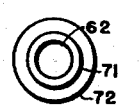 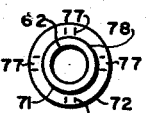
FIG. 2     FIG. 4     FIG. 6     FIG. 8     FIG. 10
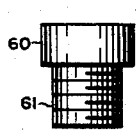 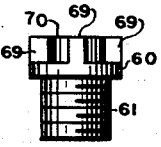 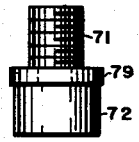 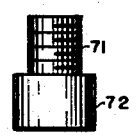 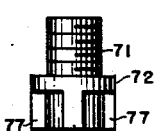
FIG. 3     FIG. 5     FIG. 7     FIG. 9     FIG. 11
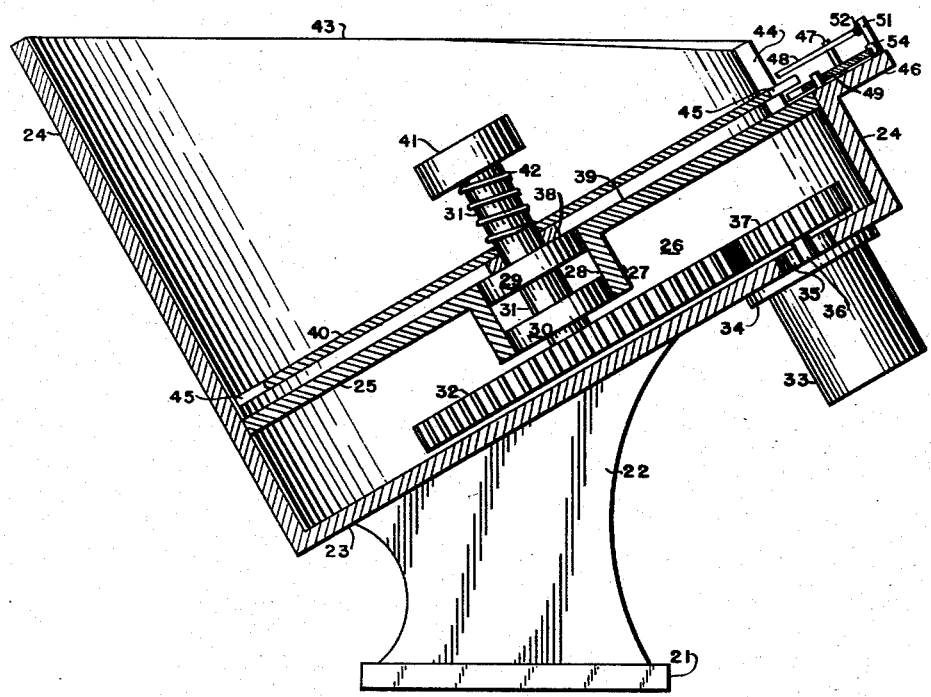
FIG. 1
INVENTOR:
EARL BIRKETT
BY Peter L. Tailer
AGT.

Feb. 9, 1960     E. BIRKETT     2,924,355
HOPPERING MECHANISMS FOR PEN CONNECTORS
Filed Nov. 7, 1957     2 Sheets-Sheet 2
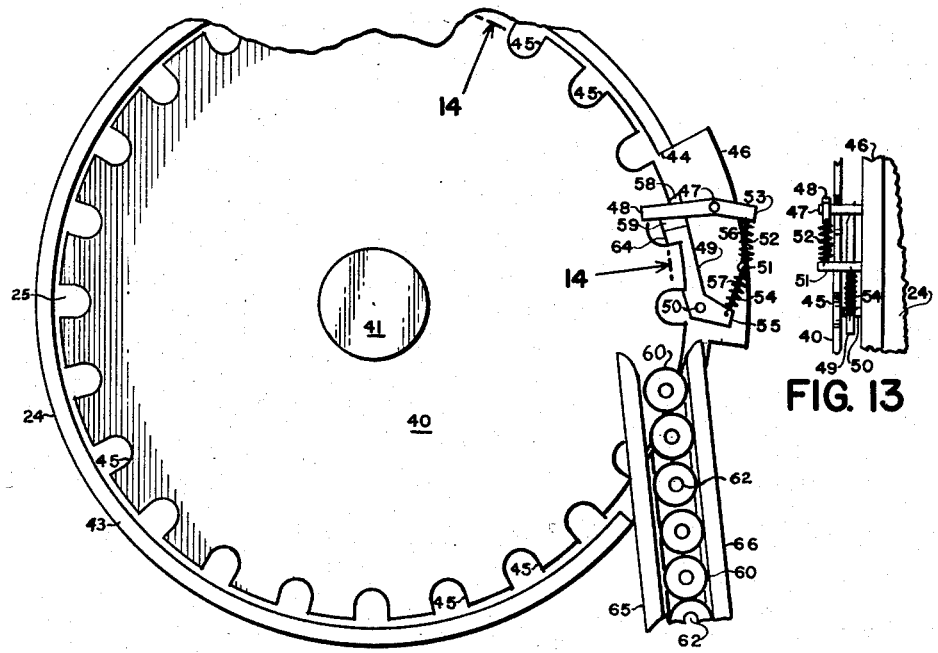
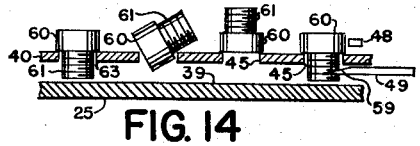
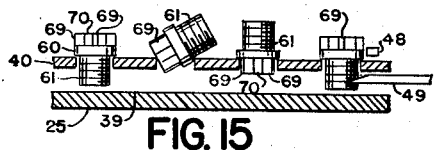
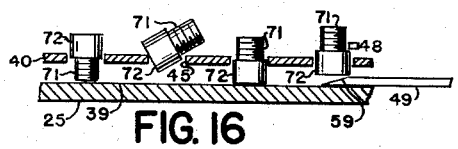
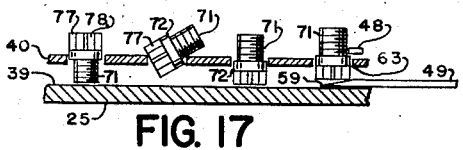
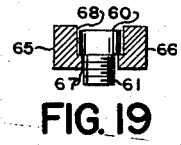
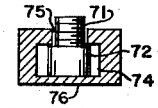
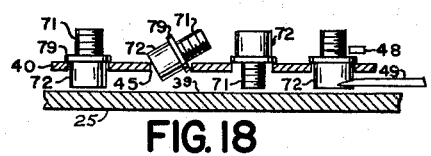
*INVENTOR:*
EARL BIRKETT
BY Peter L. Tailer
A.G.T.

United States Patent Office 2,924,355
Patented Feb. 9, 1960

2,924,355
HOPPERING MECHANISMS FOR PEN CONNECTORS

Earl Birkett, Brooklyn, N.Y.

Application November 7, 1957, Serial No. 695,158

3 Claims. (Cl. 221—167)

This invention relates in general to hoppering mechanisms and it relates more particularly to an improved mechanical hoppering mechanism for pen connectors and like irregular objects.

At the present time a great deal of manual labor is required in the assembly of ball point pens because there is a lack of sufficiently inexpensive and suitable hoppering mechanisms to handle their irregular component parts. One of these irregular parts, called a pen connector, has a larger cylindrical portion which may be pressed into the open end of a pen cap to be secured in a force fit. A smaller threaded portion is formed integrally with the larger cylindrical portion so that it may protrude beyond the open end of the pen cap. The barrel of the pen may be formed with internal threads to secure the barrel about the threaded portion of the pen connector and thus to the pen cap. The pen connector also contains a longitudinal channel through which a writing cartridge may pass. These pen connectors are made in a wide variety of sizes and shapes and they are used in a large proportion of all ball point pens.

An object of this invention is to provide a superior, more inexpensive, mechanical hoppering mechanism to feed pen connectors and like objects.

Another object of this invention is to provide a mechanical hoppering mechanism for pen connectors that will automatically hopper a given size of pen connectors at whatever rate the hoppered pen connectors are used or removed.

Still another object of this invention is to provide a mechanical hoppering mechanism for pen connectors that will load a track with positioned pen connectors and will urge the pen connectors along the track with a pre-selected force.

Yet another object of this invention is to provide a mechanical hoppering mechanism for pen connectors that easily may be adjusted to handle a wide variety of different types and sizes of pen connectors.

A further object of this invention is to provide an improved mechanical hoppering mechanism for pen connectors comprising a sloping surface forming the bottom wall of a circular container, a thin circular disk which rotates a spaced distance above the sloping bottom wall and which has peripheral notches formed in its edges into which pen connectors may extend in a number of positions, means to eject the pen connectors in all but one position from the notches, and a track into which the remaining positioned pen connectors are deposited.

A still further object of this invention is to provide, as a portion of a mechanical hoppering mechanism for pen connectors, means to eject pen connectors extending in all but one position into peripheral notches in a rotating disk, said means comprising a first spring loaded finger extending normal to the direction of travel of the edge of the disk above the disk and at least partly above the notches in the disk and a second spring loaded finger extending tangentially inward under the disk with a forward facing upward sloping surface.

Additional objects, advantages and features of invention reside in the construction, arrangement and combination of parts involved in the embodiment of the invention and its practice otherwise as will be understood from the following description and accompanying drawings wherein:

Fig. 1 is a side view of the hoppering mechanism with some of its elements shown in longitudinal section to better reveal its internal construction;
Fig. 2 is a top view of a standard pen connector;
Fig. 3 is a side view of a standard pen connector;
Fig. 4 is a top view of a standard die cast pen connector;
Fig. 5 is a side view of a standard die cast pen connector;
Fig. 6 is a top view of a slim banded pen connector;
Fig. 7 is a side view of a slim banded pen connector;
Fig. 8 is a top view of a slim pen connector;
Fig. 9 is a side view of a slim pen connector;
Fig. 10 is a top view of a die cast slim pen connector;
Fig. 11 is a side view of a die cast slim pen connector;
Fig. 12 is a view from above the hoppering mechanism taken at right angles to the sloping bottom wall of the hopper;
Fig. 13 is a side view of a broken away portion of the hoppering mechanism showing the two selector levers;
Fig. 14 is a section taken on the segment 14—14 in Fig. 12 through the rotating disk and the bottom wall of the hopper showing standard pen connectors being hoppered as they are carried by the rotating disk;
Fig. 15 is a section similar to that of Fig. 14 showing standard die cast pen connectors being hoppered;
Fig. 16 is a section similar to that of Fig. 14 showing slim pen connectors being hoppered;
Fig. 17 is a section similar to that of Fig. 14 showing slim die cast pen connectors being hoppered;
Fig. 18 is a section similar to that of Fig. 14 showing slim banded pen connectors being hoppered;
Fig. 19 is a cross section through a track that could be used to receive pen connectors that are hoppered with their threaded portions downward; and
Fig. 20 is a cross section through a track that could be used to receive pen connectors that are hoppered with their threaded portions upwards.

Referring to the drawings in detail, Fig. 1 shows the basic elements comprising the hoppering mechanism. A horizontal base plate 21 is secured to and supports the vertical support member 22 which is fixed to the bottom member 23 to hold it at a considerable angle to the horizontal. A circular side wall 24 extends upwards at right angles from the sloping bottom member 23. Secured within the circular side wall 24 a spaced distance above and parallel to the bottom member 23 is the bottom wall 25. The bottom member 23, the circular side wall 24 and the bottom wall 25 define the cylindrical transmission chamber 26. Extending downward into the transmission chamber 26 from the bottom wall 25 is the concentric, cylindrical protrusion 27 containing the circular channel 28. The two ball bearings 29 and 30 are secured by a press fit within the channel 28 to rotatably support the main shaft 31 which extends into the transmission chamber 26 to have the large pinion gear 32 affixed to its lower end. Mounted below the bottom member 23 is the low speed electric motor 33 which is secured to the bottom member 23 by means of the mounting flange 34. Extending upward through an aperture 35 in the bottom member 23 into the transmission chamber 26 is the motor shaft 36 which has the small pinion gear 37 affixed to its upper end to engage the large pinion gear 32. Therefore, as the low speed motor 33 turns, it drives the main shaft 31 at an even lower rate of speed.

Secured about and turning with the main shaft 31 is the spacer 38 positioned so that its upper surface is a given distance above the upper surface 39 of the bottom wall 25. Rotatably disposed about the main shaft 31 above the spacer 38 is the disk 40. The torque control knob 41 is screwed downwards about the upper end of the main shaft 31 to compress the coil spring 42 to a greater or lesser degree. If the coil spring 42 is compressed to a greater degree, it forces the disk harder against the spacer 38 to increase the force needed to prevent the disk 40 from rotating with the main shaft 31 and the spacer 38. The circular side wall 24 extends upward beyond the bottom wall 25 to terminate in the horizontal edge 43 except for a relatively small portion 44 that is cut away even with the top surface 39 of the bottom wall 25 near its most upwardly raised portion. The disk 40, which extends with a small clearance almost to the side wall 24, has the specially formed U-shaped notches 45 cut into its periphery.

Additional elements comprising this hoppering mechanism are further shown in Fig. 12. Opposite a part of the cut-away portion 44 of the circular side wall 24, there is formed the shelf 46 of which the top surface is a further extension of the top surface 39 of the bottom wall 25. To this shelf 46 there is fixed the pin 47 about which the upper finger 48 is rotatably secured and there is also fixed to the shelf 46 the pin 50 about which the lower finger 49 is rotatably secured. From the fixed spring anchoring pin 51 there extends the spring 52 to the outwardly disposed end 53 of the upper finger 48 and there also extends the spring 54 to the outwardly disposed leg 55 of the lower finger 49. Rigidly fixed to the spring anchoring pin 51 and extending outward within the coils of the springs 52 and 54 there may be placed the two stop members 56 and 57 which serve to limit the movement toward the spring anchor pin 51 of the outwardly disposed end 53 of the upper finger 48 and the outwardly disposed leg 55 of the lower finger 49. The lower finger 49 has a forward edge 58 that extends outward at an acute angle from the rim of the disk 40 and it has an upward sloping surface 59 formed on its tip.

Referring now to Fig. 12 and Fig. 14, the functioning of this hoppering mechanism as it hoppers the standard pen connectors shown in Fig. 2 and Fig. 3 may be seen. As it may be observed in Fig. 3, this pen connector is about as long as its greatest diameter. This ratio of length to the greatest width is to be expected as no pen connector is in current, common use that is more than twice as long as its greatest diameter. A quantity of these standard pen connectors, as shown in Fig. 2 and Fig. 3 having a larger diameter portion 60, an integral smaller diameter portion 61, and a longitudinal channel 62, is placed upon the disk 40 within the circular side wall 24. To hopper the pen connectors, the best angle of inclination of the disk 40 to the horizontal has been found to vary between 25 and 45 degrees depending upon the particular pen connector being hoppered. Therefore it may be considered desirable to make the vertical support member 22 adjustable or replaceable to vary the angle of inclination of the disk 40 to best suit the particular pen connector being hoppered. Because the disk is inclined, the pen connectors will pile up on the lower side of the disk. The low speed motor is then started to rotate the disk clockwise as shown in Fig. 12. Although a disk speed of 7 r.p.m. has been found to be very satisfactory, the speed may be considerably varied. Also, if the rotation of the disk tends to carry the pile of connectors upward anywhere near the upper and lower fingers, a stationary barrier may be placed near the surface of the disk away from the U-shaped notches to generally confine the pile of pen connectors over the lower half of the disk. However, this stationary barrier may not be needed if the hopper is not too heavily loaded.

As the disk rotates under the pile of standard pen connectors, some connectors will extend into the U-shaped notches 45 to be carried along with the disk toward the upper and lower fingers. As shown in Fig. 14, the disk 40 is shown moving from left to right as it carries standard pen connectors. A pen connector falling into a position such as that shown on the left in Fig. 14 will not be dislodged as it is carried under the pile of pen connectors because the disk 40 is relatively thin compared to the width of the U-shaped notches 45. For this reason any side force on the larger diameter portion 60 will twist the connector to jam the smaller diameter threaded portion 61 under a lower edge 63 of the U-shaped notches 45.

As shown on the right hand side of Fig. 14 and in Fig. 12, a standard connector in this upright position strikes the forward edge 58 of the lower finger 49 and causes the lower finger 49 to pivot clockwise about the pin 50 so that the inner edge 64 of the lower finger 49 tends to press and hold the connector in the U-shaped notch 45 with the result that the upper finger 48 cannot dislodge the connector to tumble it down the inclined disk 40 and back into the pile of connectors. In this case the upper finger 48 merely swings aside to allow the correctly positioned standard pen connector to pass whereon the upper finger 48 snaps back into position. However, if a standard pen connector is not deeply seated in a U-shaped notch 45 or if it is in the position of the pen connector shown second from the left in Fig. 14, the upward sloping surface 59 at the front edge of the lower finger 49 will urge the connector upwards so that the upper finger 48 will be sure to dislodge the connector and send it tumbling back into the pile.

Fig. 19 is a cross-section of the track used to remove the correctly positioned standard pen connectors from the U-shaped notches in the disk 40. This track consists of the two side members 65 and 66. Between these two side members there is formed the upper and wider channel 68 to accommodate the larger cylindrical portion 60 of the standard pen connectors and there is also formed the lower and narrower channel 67 to accommodate the narrower, threaded portion of the standard pen connectors. As shown in Fig. 12, this track intersects the edge of the disk 40 at an acute angle after it passes the upper and lower fingers. The outer side member 66 of the track lies beyond the edge of the disk 40 and the inwardly disposed side member 65 of the track extends over the disk past the innermost portion of the path of the U-shaped notches 45. To extend over the disk, the side member 65 has its lower portion cut away to allow for the passage of the disk. The track is thus positioned so that the lower portion of the channel 68 is slightly below the upper surface of the disk 40. Therefore the standard pen connectors are urged outward from the U-shaped slots by the track as the disk rotates and they are urged along the track by the disk. If the track then becomes loaded with these standard pen connectors faster than they are removed, the last connector that is arrested both in a U-shaped notch and in the track will jam the disk and prevent it from turning. At this time as shown in Fig. 1, the main shaft 31 will continue to turn with the spacer 32, the coil spring 42, and the torque control knob 41. The disk then acts as a clutch while it urges the hoppered and positioned connectors down the track. Therefore, when any connector using or assembling machine operates at a slower rate than the hoppering mechanism in removing the positioned connectors from the track, the hoppering mechanism will always match the rate of the machine it is feeding. Also, by tightening the torque control knob 41, the connectors may be urged with more force down the track. This allows the hoppering mechanism to be placed below the machine that it is feeding to force the connectors upwards along the track which is a great advantage in some applications. The exact embodiment of the invention that is illustrated in Fig. 1 and Fig. 12 will deliver more than 80 standard pen connectors per minute to the track when the disk is turning at a speed of 7 r.p.m.

Fig. 15 shows the hoppering of standard die cast pen connectors such as that shown in Fig. 4 and Fig. 5. This standard die cast pen connector usually has the same overall dimensions as the standard pen connector shown in Fig. 2 and Fig. 3 except that the larger cylindrical portion 60 is made with less material to form the radial wings 69 which extend from the smaller central hub 70. This standard die cast pen connector is hoppered in exactly the same manner as is the standard pen connector with one minor exception. It can be seen in Fig. 14 that the third standard pen connector from the left cannot enter the U-shaped notch 45 in the inverted position. However it can be seen in Fig. 15 that the third standard die cast pen connector from the left may enter the U-shaped notch 45 in the inverted position if the radial wings 69 form an angle near 45 degrees with the edge of the disk 40. In this position only the wings 69 and the central hub 70 extend into the U-shaped notch 45 and the lower finger 49 urges the standard die cast pen connector upwards to be rejected by the upper finger 48. In actual practice the same hoppering mechanism can handle both the standard pen connectors and the standard die cast pen connectors without any adjustment.

Fig. 16 shows the hoppering of a slim pen connector such as that shown in Fig. 8 and Fig. 9. These pen connectors are used in narrow slim pens so that their smaller threaded portions 71 and their larger diameter portions 72 are considerably smaller than the corresponding portions of the standard pen connector. However the longitudinal channel 62 generally remains the same to accommodate the passage of a standard ball point pen cartridge. The same hoppering mechanism may be used for slim pen connectors as for standard pen connectors because the U-shaped notch that allows the entrance of the smaller threaded portion 61 of the standard pen connector also allows the passage of the larger cylindrical portion 72 of the slim pen connector. Therefore the larger diameter portion 72 may extend into a U-shaped notch 45 until it is restrained by the upper surface 39 of the bottom wall 25. To hopper these slim pen connectors, the lower finger 49 may be made adjustable to be moved down into the position shown in Fig. 16. In this position the bottom finger 49 rests against the top surface 39 to raise all the slim pen connectors upwards as they pass over it and ride up the upward sloping surface 59. As it is raised upwards, a slim pen connector in the position of that shown on the left in Fig. 16 would have only its smaller threaded portion 71 left within the U-shaped notch 45 with the result that the slim pen connector would then be easily dislodged by the upper finger 48. The slim pen connector as shown second from the left in Fig. 16 would also be easily dislodged by the upper finger 48. However, the slim pen connector shown third from the left in Fig. 16 would only jam on the lower edge 63 of the U-shaped notch 45 as it was pressed by the upper finger 48 so that it would remain in position within the U-shaped notch 45 to be carried to the track. The track used to hopper the slim pen connectors is formed from a rectangular piece of stock having a smaller channel 75 formed in its upper portion to receive the threaded portion 71 of a slim pen connector and having a larger channel 74 formed in its lower portion to receive the larger diameter portion 72 of a slim pen connector. The track which handles the slim pen connectors is positioned with the upper surface of its bottom wall 76 slightly below the top surface 39 of the bottom wall 25 and it is cut away as is the track that handles the standard pen connectors to allow the passage of the disk 40.

The die cast slim pen connector that is shown in Fig. 10 and Fig. 11 has its larger diameter portion 72 made with less material so that the radial wings 77 are formed to project from the small central hub 78. These slim die cast pen connectors may be hoppered interchangeably with the slim pen connectors in the manner that has been described.

Banded pen connectors may be slim as shown in Fig. 6 and Fig. 7 or they may be of standard size. In either case they are formed with a thin banded portion 79 that is disposed between the threaded portion 71 and the larger diameter portion 72. When a ball point pen is assembled using a pen connector in the manner that has been described, this band portion 79 extends outward between the cap and the pen barrel so that the assembled pen looks as if it had a band placed about its middle made of the same material as the pen connector. If the banded portion 79 protrudes a considerable distance beyond the larger diameter portion 72, the pen connector may be hoppered as shown in Fig. 18. On the other hand if the banded portion 79 does not protrude very far beyond the larger diameter portion 72, the slim banded pen connectors may be hoppered interchangeably with the slim pen connectors. As shown in Fig. 18, the banded portion 79 limits the entrance of the slim banded pen connectors into the U-shaped notches 45 so that the lower finger 49 is positioned to function in the same manner as when standard pen connectors are being hoppered. As shown, the lower finger secures a slim banded pen connector which is in the position shown on the left in Fig. 18 within the U-shaped notch 45 by the large diameter portion 72. Slim banded pen connectors in the other positions shown are rejected by the upper finger 48.

If it is considered desirable, a separate hoppering mechanism may be made to hopper each kind of pen connector. In this case, the hoppering mechanism made to hopper the slim pen connectors may be made with a wedge shaped ramp secured below the path of the U-shaped notches 45 to replace the lower finger 49 which serves the same purpose. Naturally this invention is not limited to a hoppering mechanism for pen connectors as it may be used to hopper any like objects.

While I have disclosed my invention with particularity in the best forms known to me, it will nevertheless be understood that these are purely exemplary and that modifications in the construction, combination, and arrangement of parts and the substitution of mechanical equivalents may be made without departing from the spirit of the invention except as it may be more particularly limited in the appended claims wherein I claim:

1. A hoppering mechanism for pen connectors and like objects comprising an inclined bottom wall, a circular side wall extending upward normal to said bottom wall with a gap in said circular side wall by the uppermost portion of said bottom wall, a shaft rotatably mounted normal to said bottom wall and concentrically located within said circular side wall, means to turn said shaft at a low rate of speed, a thin disk extending with slight clearance to said circular side wall, rotatably disposed about said shaft a spaced distance above said bottom wall, and containing peripheral notches through which at least a portion of said pen connectors may extend, means to cause said shaft to exert a torque on said disk to cause said disk to rotate, an upper spring loaded finger extending above and substantially across the path of the peripheral notches, an inclined surface extending upward from the upper surface of said inclined bottom wall below the path of said peripheral notches to raise the pen connectors positioned within the peripheral notches upwards to allow said upper spring loaded finger to tumble incorrectly positioned pen connectors from the peripheral notches, and a track element extending through the gap in said circular side wall to receive the remaining correctly positioned pen connectors from the peripheral notches in said disk.

2. A hoppering mechanism for pen connectors and like objects comprising an inclined bottom wall, a circular side wall extending upward normal to said bottom wall with a gap in said circular side wall by the uppermost portion of said bottom wall, a shaft rotatably mounted normal to said bottom wall and concentrically located within said circular side wall, means to turn said shaft at a low rate of speed, a thin disk extending with slight clearance to said circular side wall, rotatably disposed about said shaft a spaced distance above said bottom wall, and containing peripheral notches through which at least a portion of said pen connectors may extend, means to cause said shaft to exert a torque on said disk to cause said disk to rotate, an upper spring loaded finger extending above and substantially across the path of the peripheral notches, a lower spring loaded finger extending tangentially inward under the path of the peripheral notches having an angled front edge and an upward sloping surface on its forward tip so that correctly positioned pen connectors will strike the angled front edge to cause said lower finger to swing outward and hold said correctly positioned connectors into the peripheral notches with the inward facing edge of said lower finger and so that incorrectly positioned pen connectors will be raised upwards by the upward sloping surface to allow said upper finger to tumble said incorrectly positioned pen connectors from the peripheral notches, and a track element extending through the gap in said circular side wall to receive the remaining correctly positioned pen connectors from the peripheral notches in said disk.

3. The combination according to claim 2 wherein said lower spring loaded finger is adjustable and may be placed against said bottom wall with the upward sloping surface of said lower spring loaded finger sloping upward from the upper surface of said bottom wall below the path of the peripheral notches in said disk to raise pen connectors positioned within the peripheral notches upwards allowing said upper spring loaded finger to tumble incorrectly positioned pen connectors from the notches.

References Cited in the file of this patent
UNITED STATES PATENTS

| | | |
|---|---|---|
| 366,115 | Kingsland | July 5, 1887 |
| 2,033,090 | Barker | Mar. 3, 1936 |